US010969231B2

(12) United States Patent
Jin et al.

(10) Patent No.: US 10,969,231 B2
(45) Date of Patent: Apr. 6, 2021

(54) MAP DATA UPDATE SYSTEM AND NON-TRANSITORY COMPUTER-READABLE STORAGE MEDIUM

(71) Applicant: TOYOTA JIDOSHA KABUSHIKI KAISHA, Toyota (JP)

(72) Inventors: Xin Jin, Nagoya (JP); Hironobu Sugimoto, Nagoya (JP); Shingo Kinashi, Okazaki (JP); Kazuteru Maekawa, Miyoshi (JP); Sadahiro Koshiba, Takahama (JP); Takahiro Yamaguchi, Okazaki (JP); Yuji Sato, Owariasahi (JP); Seiji Takahata, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 16/101,719

(22) Filed: Aug. 13, 2018

(65) Prior Publication Data
US 2019/0086216 A1 Mar. 21, 2019

(30) Foreign Application Priority Data
Sep. 20, 2017 (JP) .............................. JP2017-179749

(51) Int. Cl.
*G01C 21/32* (2006.01)
*G01C 21/36* (2006.01)

(52) U.S. Cl.
CPC ......... *G01C 21/32* (2013.01); *G01C 21/3617* (2013.01)

(58) Field of Classification Search
CPC ...................... G01C 21/32; G01C 21/3617
See application file for complete search history.

(56) References Cited

U.S. PATENT DOCUMENTS

| 7,516,156 B2 * | 4/2009 | Klein ..................... G06Q 10/08 702/5 |
| 8,423,666 B2 * | 4/2013 | Garcia-Luna-Aceves ................... H04L 67/1008 709/242 |
| 9,157,751 B2 * | 10/2015 | Pfeifle ..................... G01C 21/32 |
| 9,507,808 B2 * | 11/2016 | Fischer ................... G06F 16/21 |
| 9,880,011 B2 * | 1/2018 | Ding ..................... G09B 29/106 |

(Continued)

FOREIGN PATENT DOCUMENTS

| JP | 10-124674 A | 5/1998 |
| JP | 2009192420 A | 8/2009 |
| JP | 2010237124 A | 10/2010 |

OTHER PUBLICATIONS

Communication dated Dec. 15, 2020 from the Japanese Patent Office in Application No. 2017-179749.

*Primary Examiner* — Mussa A Shaawat
(74) *Attorney, Agent, or Firm* — Sughrue Mion, PLLC (57) ABSTRACT

The present invention provides technology that updates a map such that appropriate guidance can be provided near an intersection. A map data update system updates map data on a link-by-link basis and includes a link acquisition portion that acquires an existing link which is a link indicated by existing map data and a new link which is a link indicated by new map data, and a link update portion that updates the existing link with the new link based on a shape of a portion of the existing link connected to an intersection and a shape of a portion of the new link corresponding to the existing link, the portion being connected to the intersection.

3 Claims, 4 Drawing Sheets

(56) References Cited

U.S. PATENT DOCUMENTS

| | | | |
|---|---|---|---|
| 10,060,751 B1* | 8/2018 | Chen | G06F 16/29 |
| 10,135,683 B1* | 11/2018 | Medved | H04L 41/0836 |
| 2002/0128768 A1* | 9/2002 | Nakano | G01C 21/32 |
| | | | 701/533 |
| 2003/0179742 A1* | 9/2003 | Ogier | H04L 1/1887 |
| | | | 370/351 |
| 2010/0235083 A1* | 9/2010 | Takahata | G01C 21/32 |
| | | | 701/533 |
| 2011/0153661 A1* | 6/2011 | Sakai | G01C 21/32 |
| | | | 707/770 |
| 2011/0276263 A1* | 11/2011 | Shimotani | G06F 16/29 |
| | | | 701/532 |
| 2011/0295983 A1* | 12/2011 | Medved | H04L 47/10 |
| | | | 709/220 |
| 2011/0296053 A1* | 12/2011 | Medved | H04L 67/289 |
| | | | 709/241 |
| 2012/0065811 A1* | 3/2012 | Nakamura | G01C 21/32 |
| | | | 701/1 |
| 2012/0144066 A1* | 6/2012 | Medved | H04L 69/329 |
| | | | 709/242 |
| 2018/0003512 A1* | 1/2018 | Lynch | G08G 1/096716 |

* cited by examiner

MAP DATA UPDATE SYSTEM AND NON-TRANSITORY COMPUTER-READABLE STORAGE MEDIUM

BACKGROUND

1. Technical Field

The present invention relates to a map data update system and a non-transitory computer readable storage medium storing a map data update program.

2. Related Art

There is known a technique for determining whether or not roads are the same as each other (see Japanese Unexamined Patent Application Publication No. H10-124674). In Japanese Unexamined Patent Application Publication No. H10-124674, similarity is derived based on the direction and length of a straight line connecting nodes and interpolation points on a road, and it is determined whether or not the roads are the same based on the similarity.

When map data is updated, whether or not a road indicated by new data is the same as a road indicated by existing data is determined by the method as disclosed in Japanese Patent Application Publication No. H10-124674. If the roads are the same, the existing data is used as it is. Consequently, since it is not necessary to update new data for all roads, a data amount of update data can be suppressed.

However, according to the method of Japanese Patent Application Laid-Open No. H10-124674, there is a problem that even if the direction of a straight line connecting nodes and interpolation points on a road is similar, a guidance content at an intersection to which the road connects changes. Here, since there is no choice but to travel along a road in a portion of the road where there is no intersection, there is a low possibility that some guidance is provided. On the other hand, there is a high possibility that guidance such as a traveling direction at an intersection on a road will be provided near the intersection on the road. Accordingly, in Japanese Unexamined Patent Application Publication No. H10-124674, there has been a problem that it is determined that a road as a whole is similar even though the shape of the road in the vicinity of an intersection where there is a high possibility of providing guidance is changed, and that inappropriate guidance is provided near the intersection.

SUMMARY

A map data update system of the present invention updates map data on a link-by-link basis and includes a link acquisition portion that acquires an existing link which is a link indicated by existing map data and a new link which is a link indicated by new map data, and a link update portion that updates the existing link with the new link based on a shape of a portion of the existing link connected to an intersection and a shape of a portion of the new link corresponding to the existing link, the portion being connected to the intersection.

A map data update program of the present invention is a map data update program for causing a computer to function as a map data update system for updating map data on a link-by-link basis, and the map data update program causes the computer to function as a link acquisition portion that acquires an existing link which is a link indicated by existing map data and a new link which is a link indicated by new map data, and a link update portion that updates the existing link with the new link based on a shape of a portion of the existing link connected to an intersection and a shape of a portion of the new link corresponding to the existing link, the portion being connected to the intersection.

In the map data update system and the map data update program, the link update portion determines whether or not to update the existing link with the new link based on a shape of a portion of the existing link and the new link connected to the intersection. Thus, it is possible to determine whether or not to update the existing link with the new link, with emphasis on the shape of the portion connected to an intersection where there is a high possibility that some guidance will be provided. As a result, appropriate guidance can be provided near an intersection.

DETAILED DESCRIPTION

Embodiments of the present invention will be described in the following order.
(1) Configuration of Map Data Update System:
(2) Map Data Update Processing:
(3) Other Embodiments:

(1) Configuration of Map Data Update System

Figure 1:
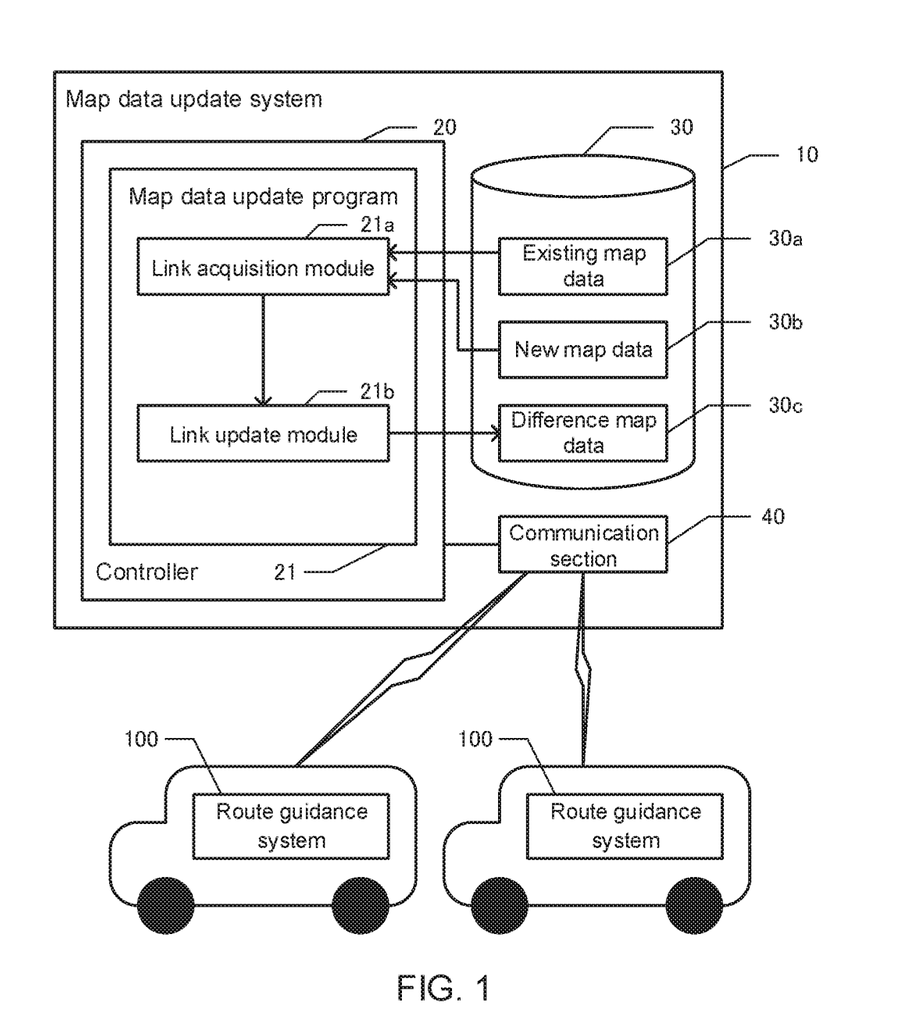
FIG. 1 is a block diagram of a map data update system.

FIG. 1 is a block diagram of a map data update system 10 according to an embodiment of the present invention. The map data update system 10 includes a controller 20, a recording medium 30, and a communication section 40. The controller 20 includes a CPU, a RAM, a ROM, and the like, and executes a map data update program 21 stored in the recording medium 30 or the ROM. The communication section 40 is a wireless communication circuit for performing wireless communication with a route guidance system 100 installed in a vehicle.

The recording medium 30 records existing map data 30a, new map data 30b, and difference map data 30c. Both the existing map data 30a and the new map data 30b include node data and link data. The node data mainly indicates information on intersections (including junctions and branch points). Specifically, the node data indicates the coordinates of a node and the shape of the node. A road section is a unit of a road separated by nodes continuous in the length direction, and nodes exist at both ends of the link. A node to which three or more links are connected corresponds to an intersection. The link data indicates a link shape, a section length, a travel time, a speed limit, a width, the number of lanes, and the like on a link-by-link basis. The link data includes shape interpolation point data indicating coordinates of a shape interpolation point set at a center position in a width direction of the link, and the shape of the link is indicated based on the shape interpolation point data.

The new map data 30b is a newer version of the map data than the existing map data 30a. A road section indicated by the new map data 30b is expressed as a new link, and a road section prescribed by the existing map data 30a is expressed as an existing link. The difference map data 30c includes node data and link data on intersections and road sections that are changed between the existing map data 30a and the new map data 30b. Accordingly, the difference map data 30c does not include node data and link data on intersections and road sections that are not changed between the existing map data 30a and the new map data 30b. The intersections and the road sections that are changed between the existing map data 30a and the new map data 30b include new intersections and road sections that are not indicated by the existing map data 30a but indicated by the new map data 30b.

Although not shown, the existing map data 30a is recorded in the route guidance system 100. The map data update system 10 transmits the difference map data 30c to the route guidance system 100. The route guidance system 100 updates the existing map data 30a with the difference map data 30c and uses the updated existing map data 30a for display of a map, a route search, and the like.

The map data update program 21 includes a link acquisition module 21a and a link update module 21b. The link acquisition module 21a and the link update module 21b are program modules that cause the controller 20 as a computer to function as a link acquisition portion and a link update portion, respectively.

The function of the link acquisition module 21a causes the controller 20 to acquire the existing link which is a link indicated by the existing map data 30a and the new link which is a link indicated by the new map data 30b. In the present embodiment, it is assumed that the link data of the existing map data 30a and the link data of the new map data 30b are given a unique link ID on a link-by-link basis, and the existing link and the new link corresponding to the same road section are given the same link ID. The function of the link acquisition module 21a causes the controller 20 to acquire the existing link and the new link given the same link ID.

Figure 2:
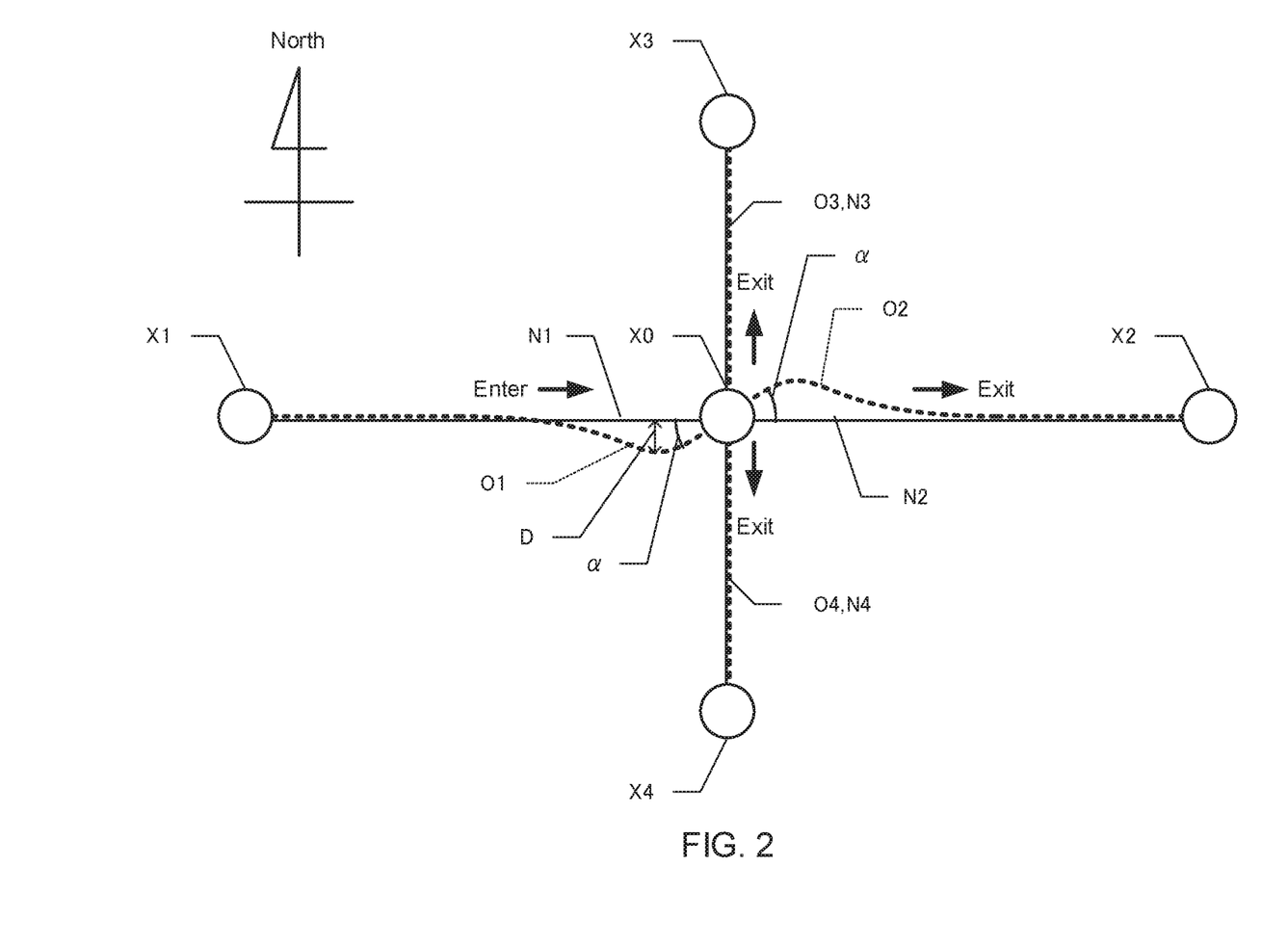
FIG. 2 is a schematic diagram of a link.

FIG. 2 is a schematic diagram showing existing links O1 to O4 and new links N1 to N4. In FIG. 2, the existing links O1 to O4 are indicated by broken lines, and the new links N1 to N4 are indicated by solid lines. For the sake of simplicity of explanation, it is assumed that there is no change in coordinates of nodes X1 to X4 to which the existing links O1 to O4 and the new links N1 to N4 are connected. The existing link O1 and the new link N1 connecting the nodes X0 and X1 correspond to the same road section. The existing link O2 and the new link N2 connecting the nodes X0 and X2 correspond to the same road section. Further, the existing link O3 and the new link N3 connecting the nodes X0 and X3 correspond to the same road section. Further, the existing link O4 and the new link N4 connecting the nodes X0 and X4 correspond to the same road section.

It is assumed that the new links N1 and N2 are straight roads in an east-west direction, and the existing links O3 and O4 and the new links N3 and N4 are straight roads in a north-south direction. The existing links O1 and O2 are generally east-west direction roads, but the road shape curves near the node X0. It is assumed that the existing link O1 and the new link N1 are one-way roads allowing travel only toward the node X0.

The function of the link update module 21b causes the controller 20 to update the existing links O1 to O4 with the new links N1 to N4 based on a shape of a portion of the existing links O1 to O4 connected to an intersection and a shape of a portion of the new links N1 to N4 corresponding to the existing links O1 to O4, the portion being connected to the intersection. In the present embodiment, the shape of the portion connected to the intersection means a shape of a portion within a predetermined proximity distance (for example, 30 m) from the nodes X0 to X4. That is, in the existing links O1 to O4, the controller 20 extracts a shape interpolation point whose straight-line distance from the nodes X0 to X4 is closest to the proximity distance, and acquires a direction of a line segment connecting the nodes X0 to X4 and the shape interpolation point as a direction of a portion of the existing links O1 to O4 connected to an intersection. Likewise, in the new links N1 to N4, the controller 20 extracts the shape interpolation point whose straight-line distance from the nodes X0 to X4 is closest to the proximity distance, and acquires the direction of the line segment connecting the nodes X0 to X4 and the shape interpolation point as a direction of a portion of the new links N1 to N4 connected to an intersection.

Further, the function of the link update module 21b causes the controller 20 to update the existing links O1 to O4 with the new links N1 to N4 based on an existing angle as a connection angle at which the two existing links O1 to O4 are connected at an intersection and a new angle as a connection angle at which the two new links N1 to N4 corresponding to the two existing links O1 to O4 are connected at the intersection. Hereinafter, in FIG. 2, a processing of determining whether or not to update the existing link O1 with the new link N1 will be described.

The function of the link update module 21b causes the controller 20 to calculate an existing angle which is a connection angle θ in the case of exiting to each of the existing links O2 to O4 as exit links from the existing link O1 as an entry link at the node X0. Likewise, the function of the link update module 21b causes the controller 20 to calculate a new angle which is the connection angle θ in the case of exiting to each of the new links N2 to N4 as exit links from the new link N1 as an entry link at the node X0. The connection angle θ is an angle indicating an amount of change in the traveling direction with reference to a direction of a portion of the existing link O1 and the new link N1 as the entry links connected to an intersection (0°). The fact that the connection angle θ is positive means that the traveling direction changes leftward, and the fact that the connection angle θ is negative means that the traveling direction changes rightward.

Further, as shown in FIG. 2, a direction of a portion of the existing link O1 connected to the node X0 is a direction inclined by α in the counterclockwise direction from the east-west direction, and a direction of a portion of the existing link O2 connected to the node X0 is a direction inclined by α in the counterclockwise direction from the east-west direction In the present embodiment, α is assumed to be 30°.

Figure 3A:
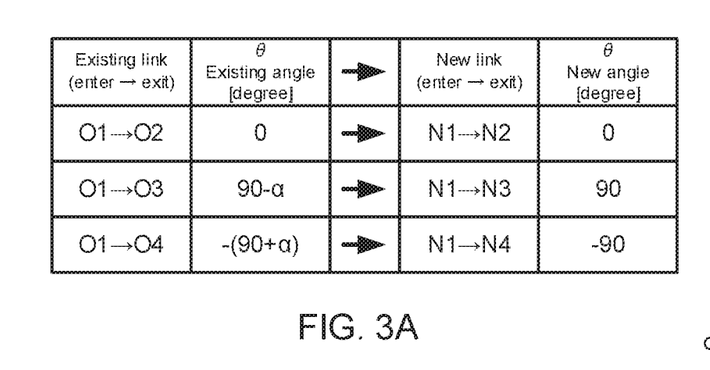
FIG. 3A is a table showing a connection angle.

FIG. 3A is a table of the connection angle θ. As shown in FIG. 3A, the connection angle θ in the case of exiting from the existing link O1 to the existing link O2 is 0°, the connection angle θ in the case of exiting from the existing link O1 to the existing link O3 is $(90-\alpha)°$, and the connection angle θ in the case of exiting from the existing link O1 to the existing link O4 is $-(90+\alpha)°$. On the other hand, the connection angle θ in the case of exiting from the new link N1 to the new link N2 is 0°, the connection angle θ in the case of exiting from the new link N1 to the new link N3 is 90°, and the connection angle θ in the case of exiting from the new link N1 to the new link N4 is −90°.

Figure 3B:
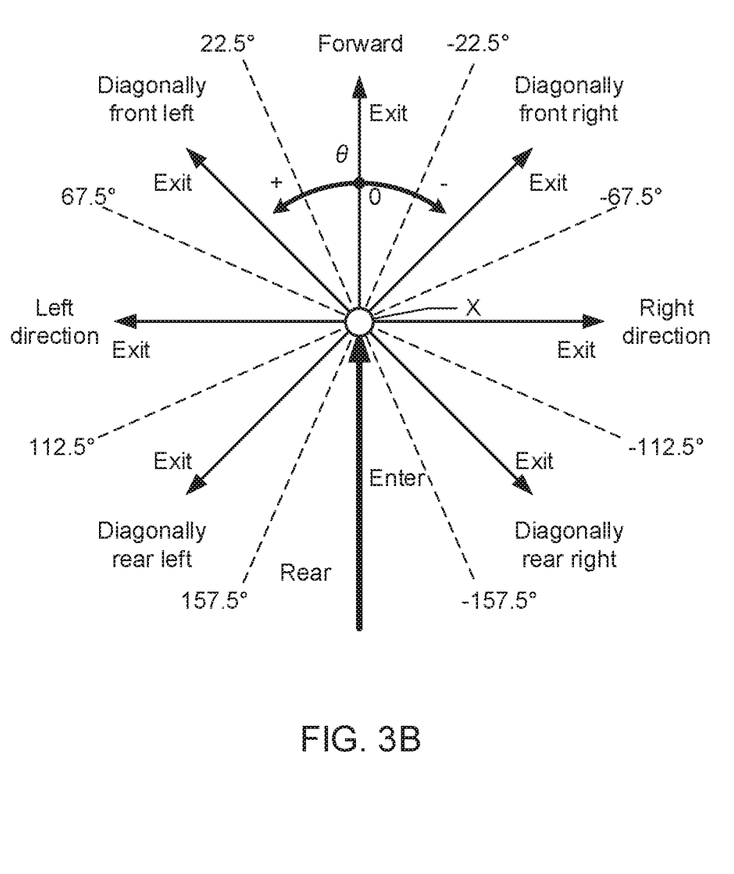
FIG. 3B is a schematic diagram showing a relationship between a connection angle and a guidance direction.

The function of the link update module 21b causes the controller 20 to update the existing link O1 with the new link N1 when a guidance direction in which the route guidance system 100 guides a change in the traveling direction corresponding to the existing angle differs from a guidance direction in which the route guidance system 100 guides a change in the traveling direction corresponding to the new angle. FIG. 3B is an explanatory diagram showing a guidance direction guided by the route guidance system 100. As shown by a broken line in FIG. 3B, a section with a connection angle θ of 45 degree break divided radially into eight equal sections around the node X is defined, and the guidance direction corresponding to a section to which the connection angle θ belongs is guided by the route guidance system 100.

The function of the link update module 21b causes the controller 20 to acquire a guidance direction corresponding to the existing angle which is the connection angle θ in the case of exiting to each of the existing links O2 to O4 from the existing link O1 and a guidance direction corresponding to the new angle which is the connection angle θ in the case of exiting to each of the new links N2 to N4 from the new link N1, and determines whether or not these guidance directions differ from each other. The existing angle which is the connection angle θ in the case of exiting from the existing link O1 to the existing link O2 is 0°, and the guidance direction is "forward". The new angle which is the connection angle θ in the case of exiting from the new link N1 to the new link N2 is 0°, and the guidance direction is "forward". Accordingly, the guidance directions do not differ between the case of exiting from the existing link O1 to the existing link O2 and the case of exiting from the new link N1 to the new link N2.

Here, the new angle which is the connection angle θ in the case of exiting from the new link N1 to the new link N3 is 90°, and the guidance direction is "left direction". On the other hand, the existing angle which is the connection angle θ in the case of exiting from the existing link O1 to the existing link O3 is (90−α)°, and α is 30°; therefore, the guidance direction is "diagonally front left". Accordingly, the guidance directions differ between the case of exiting from the existing link O1 to the existing link O2 and the case of exiting from the new link N1 to the new link N2.

The new angle which is the connection angle θ in the case of exiting from the new link N1 to the new link N4 is −90°, and the guidance direction is "right direction". On the other hand, the existing angle which is the connection angle θ in the case of exiting from the existing link O1 to the existing link O4 is −(90+α)°, and α is 30°; therefore, the guidance direction is "diagonally rear right". Accordingly, the guidance directions differ between the case of exiting from the existing link O1 to the existing link O2 and the case of exiting from the new link N1 to the new link N2.

When the guidance direction changes in the case of exiting to any one of the links connected to the node X0, the controller 20 updates the existing link O1 with the new link N1. On the other hand, when the guidance direction does not change even in the case of exiting to any one of the links connected to the node X0, the controller 20 does not update the existing link O1 with the new link N1. For example, in FIG. 2, when a is less than 22.5°, the guidance direction in the case of exiting from the existing link O1 to the existing link O3 and the guidance direction in the case of exiting from the new link N1 to the new link N3 are both "left direction", and the guidance direction in the case of exiting from the existing link O1 to the existing link O4 and the guidance direction in the case of exiting from the new link N1 to the new link N4 are both "right direction". Accordingly, in FIG. 2, when α is less than 22.5°, the controller 20 does not update the existing link O1 with the new link N1.

When the existing link O1 and the new link N1 are not one-way road sections allowing travel only toward the node X0 but are roads allowing travel bidirectionally, the controller 20 updates the existing link O1 with the new link N1 based on a shape of a portion connected to not only the node X0 but also the node X1. That is, the controller 20 calculates the existing angle and the new angle for the node X1 and updates the existing link O1 with the new link N1 based on the existing angle and the new angle. The controller 20 updates the existing link O1 with the new link N1 when the guidance direction changes in the case of existing to at least one link connected to the node X0 and the node X1. On the other hand, when the guidance direction does not change even in the case of exiting to any one of the links connected to the nodes X0 and X1, the controller 20 does not update the existing link O1 with the new link N1.

When a distance between the existing link O1 and the new link N1 is larger than a threshold value, the function of the link update module 21b causes the controller 20 to update the existing link O1 with the new link N1 regardless of the shape of the portion of the existing link O1 connected to an intersection and the shape of the portion of the new link N1 corresponding to the existing link O1, the portion being connected to the intersection. On the other hand, when the distance between the existing link O1 and the new link N1 is not larger than the threshold value, the function of the link update module 21b causes the controller 20 to update the existing link O1 with the new link N1 based on the shape of the portion of the existing link O1 connected to an intersection and the shape of the portion of the new link N1 corresponding to the existing link O1, the portion being connected to the intersection.

As shown in FIG. 2, in the present embodiment, the distance between the existing link O1 and the new link N1 means a maximum value D of the distance between the existing link O1 and the new link N1. When the maximum value D of the distance between the existing link O1 and the new link N1 is larger than a threshold value (for example, 10 m), the controller 20 updates the existing link O1 with the new link N1 regardless of the connection angle θ at an intersection. On the other hand, when the maximum value D is not larger than the threshold value, the controller 20 determines whether or not to update the existing link O1 with the new link N1 based on the connection angle θ at the intersection. The distance between the existing link O1 and the new link N1 may be a distance between two points where a perpendicular of the existing link O1 or the new link N1 intersects the existing link O1 and the new link N1.

The function of the link update module 21b causes the controller 20 to extract link data of the new link N to be updated from the new map data 30b, and creates difference map data 30c including the link data.

According to the present embodiment described above, the controller 20 determines whether or not to update the existing link O1 with the new link N1 based on a shape of a portion of each of the existing link O1 and the new link N1 connected to the node X0. Thus, it is possible to determine whether or not to update the existing link O1 with the new link N1, with emphasis on the shape of the portion connected to the node X0 where there is a high possibility that some guidance will be provided. As a result, appropriate guidance can be provided near the node X0.

Here, in the case of traveling on two links (the entry link and the exit link) at the node X0, the traveling direction changes by the connection angle θ at which the two links are connected. Thus, it is possible to determine whether or not there is a change in the travelling direction at the node X0 based on an existing angle as the connection angle θ at which two existing links O1 are connected at the node X0 and a new angle as the connection angle θ at which two new links N1 corresponding to the two existing links O1 are connected at the node X0, and when there is a change in the travelling direction at the node X0, the existing link O1 can be updated by the new link N1. Specifically, when the guidance direction in the traveling direction at the node X0 changes due to a difference between the existing angle and the new angle, since the existing link O1 is updated by the new link N1, it is possible to reduce the possibility that the traveling direction at the node X0 is improperly guided.

Here, even when a difference from a direction of the portion connected to the node X0 is small, if the distance between the existing link O1 and the new link N1 is too large, it is preferable to update the existing link O1 with the new link N1. Thus, when the maximum value D of the distance between the existing link O1 and the new link N1 is larger than the threshold value, the controller 20 updates the existing link O1 with the new link N1 regardless of the shape of the portion of the existing link O1 connected to the node X0 and the shape of the portion of the new link N1 corresponding to the existing link O1, the portion being connected to the node X0.

(2) Map Data Update Processing

Figure 4:
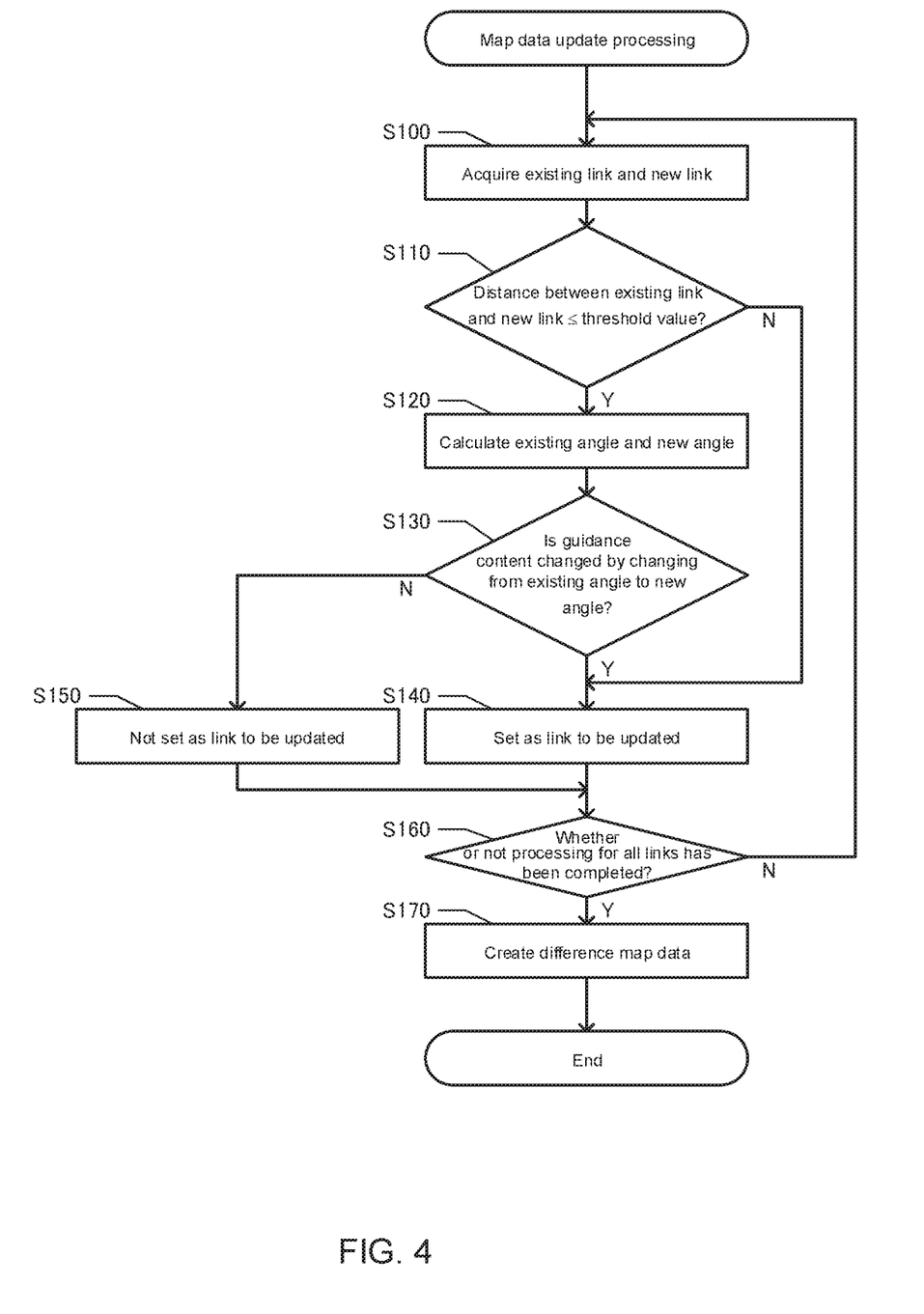
FIG. 4 is a flowchart of map data update processing.

FIG. 4 is a flowchart of map data update processing. The map data update processing is a processing executed by the map data update system 10, for example when the new map data 30b is newly created. First, the function of the link acquisition module 21a causes the controller 20 to acquire the existing link O1 and the new link N1 (step S100). That is, the controller 20 acquires the existing link O1 and the new link N1 to be processed with which common links ID are associated from the existing map data 30a and the new map data 30b. Here, the case where the existing link O1 and the new link N1 of a one-way road are to be processed will be described below. The controller 20 acquires the existing link O1 and the new link N1 and acquires the existing links O1 to O4 and the new links N1 to N4 connected to the existing link O1 and the new link N1 at the node X0 on the existing link O1 and the new link N1.

Then, the function of the link update module 21b causes the controller 20 to determine whether or not the distance between the existing link O1 and the new link N1 is not larger than a threshold value (step S110). That is, the controller 20 determines whether or not the maximum value D of the distance between the existing link O1 and the new link N1 is not larger than the threshold value.

When it is determined that the maximum value D of the distance between the existing link O1 and the new link N1 is not larger than the threshold value (step S110: Y), the function of the link update module 21b causes the controller 20 to calculate the existing angle and the new angle (step S120). When the existing link O1 and the new link N1 are roads allowing travel bidirectionally, the controller 20 acquires an existing angle representing a change in the traveling direction in the case of exiting from the existing link O1 to the existing links O2 to O4 connected to the node X0 and a new angle representing a change in the traveling direction in the case of exiting from the new link N1 to the new links N0 to N4 connected to the node X0 based on the shape of each link.

Then, the function of the link update module 21b causes the controller 20 to determine whether or not a guidance content is changed by changing from the existing angle to the new angle (step S130). That is, the controller 20 determines whether or not the existing link O1 is required to be updated by the new link N1 based on an existing angle which is the shape of the portion of the existing link O1 connected to the node X0 and a new angle which is the shape of the portion of the new link N1 corresponding to the existing link O1, the portion being connected to an intersection. Specifically, the controller 20 acquires the guidance direction corresponding to the existing angle and the guidance direction corresponding to the new angle, and determines whether these guidance directions differ.

When it is not determined that the guidance content is changed by changing from the existing angle to the new angle (step S130: N), the function of the link update module 21b causes the controller 20 not to set the existing link as a link to be updated (step S150). That is, the controller 20 performs setting such that the existing link O1 to be processed is not updated by the new link N1. On the other hand, when it is determined that the guidance content is changed by changing from the existing angle to the new angle (step S130: Y), the function of the link update module 21b causes the controller 20 to set the existing link as a link to be updated (step S160). That is, the controller 20 performs setting such that the existing link O1 to be processed is updated by the new link N1.

Also, when it is not determined that the maximum value D of the distance between the existing link O1 and the new link N1 is not larger than the threshold value (step S110: N), the function of the link update module 21b causes the controller 20 to set the existing link as a link to be updated (step S160).

Then, the function of the link acquisition module 21a causes the controller 20 to determine whether or not all links have been acquired as links to be processed (step S160). That is, the controller 20 determines whether or not the processing of determining whether or not to perform updating has been completed for all links. When it is not determined that all links have been acquired as links to be processed (step S160: N), the controller 20 returns to step S100. In other words, the next link is acquired as a link to be processed, and processing of setting the link to be processed as a link to be updated is executed.

On the other hand, when it is determined that all links have been acquired as links to be processed (step S160: Y), the function of the link update module 21b causes the controller 20 to create the difference map data 30c (step S170). That is, the controller 20 extracts the link data of the new link to be updated from the new map data 30b, and creates the difference map data 30c including the link data.

There may be cases in which a link exiting from a link to be processed has already been set as a link to be updated. For example, in FIG. 2, when the existing link O1 and the new link N1 are to be processed, there may be a case where the existing link O2 has already been set to be updated by the new link N2. In this case, the controller 20 may calculate the connection angle θ between the existing link O1 and the new link N2 as an existing angle and calculate the connection angle θ between the new link N1 and the new link N2 as a new angle.

(3) Other Embodiments

In the above embodiment, although it is described that there is no change in the position of the node X0, the new map data 30b in which the node X0 is updated from an existing node to a new node may be provided. In this case, in step S120, the controller 20 may acquire an existing angle representing a change in the traveling direction in the case of entering an existing node from the existing link O1 to be processed and exiting to any one of the links and may acquire a new angle representing a change in the traveling direction in the case of entering a new node from the new link N1 to be processed and exiting to any one of the links. Then, similarly to the above-described embodiment, the controller 20 may execute the processing after step S130. When a distance between the existing node and the new node is not less than a threshold value, the controller 20 may update all links, assuming that in the links connected to the existing node and the new node, a shape of a portion connected to an intersection greatly changes. The processing of determining a distance between the existing link O1 and the new link N1 (step S110) may not necessarily be executed, and may be omitted.

The processing of determining the distance between the existing link O1 and the new link N1 (step S110) and the processing of determining a shape of a portion of the existing link O1 and the new link N1 connected to an intersection (step S130) may be performed by a single processing. For example, the controller 20 may weight so as to become larger as it becomes closer to the node X0, calculate a weighted average of the distance between the existing link O1 and the new link N1, and update the existing link O1 with the new link N1 when the weighted average is not less than the threshold value. According to this constitution, it is possible to simultaneously determine the distance between the existing link O1 and the new link N1 and the shape of the portion connected to the intersection.

The controller 20 may update the existing link O1 with the new link N1, for example when a difference between the existing angle and the new angle is not less than the threshold value. That is, it is not necessary to consider whether or not a guidance direction changes.

The map data update system does not update all links and thereby updates the map data on a link-by-link basis in order to suppress the data amount to be updated. The map data update system may be provided with means for updating the map data, and may be provided with means for delivering the updated map data to another device such as a map display system or a navigation system. Obviously, the map data update system may be provided with means for recording updated map data on a recording medium readable by another device such as a map display system or a navigation system. The map data update system may be further provided with means for displaying a map. The map data update system may be a device that receives distribution of the map data and may request map data about the new link to be updated to a map provider or the like.

The new map data may be a newer version of map data than the existing map data or may be map data having a higher reliability than the existing map data. The new link corresponding to the existing link means a new link corresponding to a road to which the existing link corresponds. When a road is repaired, the existing link may correspond to the road before the repair, and the new link may correspond to the road after the repair. However, the road to which the existing link and the new link correspond may not be the repaired road, and the new link may be created based on results obtained by measurement by a method with higher reliability and accuracy than when creating the existing link.

The portion of the existing link connected to an intersection may be a portion within a certain distance from the intersection or may be a portion up to a shape interpolation point closest to the intersection. Likewise, the portion of the new link connected to an intersection may be a portion within a certain distance from the intersection or may be a portion up to a shape interpolation point closest to the intersection. A link update portion may update the existing link with the new link when the shape of a portion connected to an intersection is not similar between the existing link and the new link. On the other hand, the link update portion may prevent the existing link from being updated by the new link when the shape of a portion connected to an intersection is similar between the existing link and the new link. The shape of the portion connected to the intersection may be a curved shape of the link, a shape such as a width of the link, or a lane structure.

The link update portion may determine whether or not to update the existing link with the new link by considering only the shape of the portion connected to the intersection. Further, the link update portion may determine whether or not to update the existing link with the new link, with emphasis on the shape of the portion connected to the intersection as compared with other portions.

Further, the link update portion may update the existing link with the new link based on an existing angle as a connection angle at which two existing links are connected at an intersection and a new angle as a connection angle at which the two new links corresponding to the two existing links are connected at the intersection. Here, in the case of traveling on two links (entry link and exit link) at the intersection, the traveling direction changes by a connection angle at which the two links are connected. Thus, it is possible to determine whether or not there is a change in the travelling direction at the intersection based on the existing angle as the connection angle at which the two existing links are connected at the intersection and the new angle as the connection angle at which the two new links corresponding to the two existing links are connected at the intersection, and when there is a change in the travelling direction at the intersection, the existing link can be updated by the new link.

Furthermore, the link update portion may update the existing link with the new link when a guidance direction in which a route guidance system guides a change in the traveling direction corresponding to the existing angle differs from a guidance direction in which the route guidance system guides a change in the traveling direction corresponding to the new angle. That is, when the guidance direction in the traveling direction at the intersection changes due to the difference between the existing angle and the new angle, the existing link may be updated by the new link. Consequently, it is possible to reduce the possibility that the traveling direction at the intersection is improperly guided.

Here, even when a difference from a direction of the portion connected to the intersection is small, if the distance between the existing link and the new link is too large, it is preferable to update the existing link with the new link. Thus, when the distance between the existing link and the new link is larger than a threshold value, the link update portion may update the existing link with the new link regardless of the shape of the portion of the existing link connected to the intersection and the shape of the portion of the new link corresponding to the existing link, the portion being connected to the intersection. The distance between the existing link and the new link may be an average value of the distance between the existing link and the new link, the maximum value, or the median value.

As in the present invention, the method of updating a link based on the shape of a portion connected to an intersection may be applied as a program or a method. The system, program, or method as described above may be achieved as a single device or may be achieved using parts common to respective units provided in the vehicle, and thus include various aspects. For example, it is possible to provide a navigation system, a map data update system, a method, and a program including the apparatus as described above. Further, the present invention may be modified appropriately, for example, a part is designed to be software and a part is designed to be hardware. Furthermore, the present invention is also effective as a recording medium of a program controlling the apparatus. Obviously, the recording medium of software may be either a magnetic recording medium or a magneto-optical recording medium, and any recording medium which will be developed in the future can be considered in exactly the same way.

What is claimed is:

1. A map data update system for updating map data on a link-by-link basis, the map data update system comprising:
   a controller programmed to:
   acquire an existing link which is a link indicated by existing map data and a new link which is a link indicated by new map data; and
   update the existing link with the new link based on a shape of a portion of the existing link connected to an intersection and a shape of a portion of the new link corresponding to the existing link, the portion being connected to the intersection,
   wherein the existing link is updated with the new link based on an existing angle as a connection angle at which two of the existing links are connected at an intersection and a new angle as a connection angle at which two of the new links corresponding to the two of the existing links are connected at the intersection,
   wherein the existing angle is the connection angle in a case of exiting to each of the existing links as exit links from the existing links as an entry link, and the new angle is the connection angle in the case of exiting to each of the new links as exit links from the new link as an entry link, and
   wherein the existing link is updated with the new link when a guidance direction in which a route guidance system guides a changes in a traveling direction corresponding to the existing angle differs from a guidance direction in which the route guidance system guides a change in the traveling direction corresponding to the new angle.

2. The map data update system according to claim 1, wherein when the distance between the existing link and the new link is larger than a threshold value, the link update portion updates the existing link with the new link regardless of the shape of a portion of the existing link connected to the intersection and the shape of a portion of the new link corresponding to the existing link, the portion being connected to the intersection.

3. A non-transitory computer-readable medium storing a map data update program for causing a computer to function as a map data update system for updating map data on a link-by-link basis, the map data update program causing the computer to function as
   a link acquisition portion that acquires an existing link which is a link indicated by existing map data and a new link which is a link indicated by new map data and
   a link update portion that updates the existing link with the new link based on a shape of a portion of the existing link connected to an intersection and a shape of a portion of the new link corresponding to the existing link, the portion being connected to the intersection,
   wherein the existing link is updated with the new link based on an existing angle as a connection angle at which two of the existing links are connected at an intersection and a new angle as a connection angle at which two of the new links corresponding to the two of the existing links are connected at the intersection,
   wherein the existing angle is the connection angle in a case of exiting to each of the existing links as exit links from the existing link as an entry link, and the new angle is the connection angle in the case of exiting to each of the new links as exit links from the new link as an entry link, and
   wherein the existing link is updated with the new link when a guidance direction in which a route guidance system guides a change in a traveling direction corresponding to the existing angle differs from a guidance direction in which the route guidance system guides a change in the traveling direction corresponding to the new angle.

* * * * *